United States Patent
Kaji et al.

[11] Patent Number: 5,855,692
[45] Date of Patent: Jan. 5, 1999

[54] BATTERY CHARGER AND SOLAR CELLS FOR BATTERY CHARGING

[75] Inventors: Masanori Kaji; Masayosi Ono; Yosinobu Takabatake, all of Sumoto; Yosinori Kaido, Tsuna Gun; Takahiro Haga; Masaru Hikosaka, both of Mihara Gun, all of Japan

[73] Assignee: Sanyo Electric Co., Ltd., Moriguchi, Japan

[21] Appl. No.: 904,614

[22] Filed: Aug. 1, 1997

Related U.S. Application Data

[62] Division of Ser. No. 598,019, Feb. 7, 1996, Pat. No. 5,701,067.

Foreign Application Priority Data

| | | | |
|---|---|---|---|
| Feb. 24, 1995 | [JP] | Japan | 7-37026 |
| Apr. 28, 1995 | [JP] | Japan | 7-105419 |
| Sep. 29, 1995 | [JP] | Japan | 7-253563 |
| Nov. 24, 1995 | [JP] | Japan | 7-305999 |

[51] Int. Cl.$^6$ .......................... H01L 25/00; H01M 10/44
[52] U.S. Cl. .......................... 136/245; 136/256
[58] Field of Search .......................... 320/101; 136/245, 136/256

[56] References Cited

U.S. PATENT DOCUMENTS

| | | | |
|---|---|---|---|
| 4,107,725 | 8/1978 | Roen | 15/30 |
| 4,209,346 | 6/1980 | King | 136/89 |
| 4,537,838 | 8/1985 | Jetter et al. | 429/9 |
| 4,686,441 | 8/1987 | Petterson | 320/2 |
| 5,133,810 | 7/1992 | Morizane et al. | |
| 5,253,300 | 10/1993 | Knapp | 381/68.6 |
| 5,522,943 | 6/1996 | Spencer et al. | 136/245 |

FOREIGN PATENT DOCUMENTS

| | | |
|---|---|---|
| 3611544 | 10/1987 | Germany. |
| 9405672 | 8/1994 | Germany. |
| 61-123550 | 8/1986 | Japan. |
| 61-129436 | 8/1986 | Japan. |
| 4-218980 | 8/1992 | Japan. |

OTHER PUBLICATIONS

Edumund Scientific–1993 Annual Reference Catalog For Optical Science and Education, 1993.

Solar Webb Inc., "Web Photovoltaic Power", 1991.

*Primary Examiner*—Mark Chapman
*Attorney, Agent, or Firm*—Wenderoth, Lind & Ponack, L.L.P.

[57] ABSTRACT

A battery charger is provided with a battery charger unit which connects to, and charges a battery Solar cells are used as the source of power for charging the battery, and connecting parts electrically connect the solar cells and the battery charger unit. The battery charger unit is provided with a solar cell compartment for stowing the solar cells batteries when not in use charging a battery.

10 Claims, 19 Drawing Sheets

BATTERY CHARGER AND SOLAR CELLS FOR BATTERY CHARGING

This is a divisional application of Ser. No. 08/598,019, filed Feb. 7, 1996, now U.S. Pat. No. 5,701,067.

BACKGROUND OF THE INVENTION

This invention relates to a battery charger which charges a battery using solar cells, and to the solar cells used for battery charging.

In recent years all types of electrical equipment have been miniaturized and made lightweight, and many portable electronic products have become available. Since commercial alternating current cannot be used with portable electrical equipment, batteries are used. Single use batteries such as dry-cell batteries and rechargeable batteries such as nickel-cadmium batteries are well known battery power sources. However, since rechargeable batteries can be repeatedly re-used simply by charging and have large capacity allowing high current discharge, they are extremely convenient to use.

It is known that rechargeable batteries can be charged using commercial alternating current or using solar cells. Commercial alternating current has the drawback that it is typically used only indoors and cannot be used outdoors to immediately recharge electrical equipment with low batteries. For this reason, it is necessary to carry a spare battery. A further drawback of charging with commercial alternating current is that rectifying circuitry is required to convert the alternating current to direct current. This makes the charging circuitry more complicated.

On the other hand, rechargeable batteries can be charged by solar cells indoors or outdoors as long as the solar cells produce electricity. Therefore, batteries can be recharged even when they run-down while portable equipment is being carried about. Since solar cells do not use commercial alternating current, they are economical. Further, since solar cell output is direct current, no alternating current conversion circuitry is required.

However, since 100% of the light energy cannot be converted to electrical energy, sufficient output cannot easily be obtained. For this reason, the light receiving area of solar cells must be made large in order to obtain enough output to charge batteries. Since making the solar cell light receiving area large means making the solar cells themselves large, this has the drawback that the larger the solar cells are made, the less portable they become.

Advances in rechargeable battery technology has resulted in commercial products such as high capacity nickel-hydrogen batteries and lithium ion batteries with higher voltage per cell than nickel-cadmium batteries. Consequently, charging current and voltage must be increased for charging these various types of batteries and the light receiving area of the solar cells must be further increased. For this reason, solar cells must be made larger and larger resulting in the drawback that it is difficult to make a battery charger powered by solar cells which is portable.

It is the first object of this invention to present a battery charger with solar cells which is easily portable, which can be quickly set to recharge run-down batteries in portable electrical equipment used outdoors, and has solar cells which have sufficient output for charging batteries.

Often in the case of portable electrical equipment with rechargeable batteries, the equipment is put in a carrying case or bag for transport. Japanese Utility Model Publication No. 61-129436 issued Aug. 13, 1986, discloses a bag which carries rechargeable batteries and which can charge those rechargeable batteries with solar cells. This bag is shown in FIG. 2. The bag of FIG. 2 is a mountain climbing type backpack with solar cells 210 provided on the upper flap portion of the bag. The rechargeable batteries 213 are retained within the bag and the solar cells 210 are connected to the rechargeable batteries 213 through lead wires 26 and the battery charger 214. As a result, the rechargeable batteries 213 are charged by the solar cells 210.

It is generally known that battery temperature rises when rechargeable batteries are charged. It is also known that leaving rechargeable batteries in a high temperature environment for long periods invites battery degradation. However, heat is enclosed within the bag described by the above mentioned application when the upper flap is closed and, furthermore, the batteries generate heat when they are charging.

It is the second object of this invention to provide a bag which can carry portable electrical equipment housing rechargeable batteries without degrading those rechargeable batteries and, further, can charge those rechargeable batteries while the electrical equipment is within the bag.

Incidentally, the footprint of large solar cells can be made smaller when not in use if the solar cells are designed to be folded up. Japanese Non-examined Utility Model Publication No. SHO61 123550, issued 1986, discloses a solar cell apparatus comprising a plurality of solar cell devices connected by leads which can bend. This configuration of solar cell apparatus has the characteristic that it can be folded up and made compact when not in use. Further, solar cells can be mounted on folding parts of electrical equipment such as portable telephones which have a case structure allowing parts to bend and fold up. Apparatus with solar cells mounted on folding parts of the case have solar cells on more than one surface of the case and have the characteristic that solar cell area and hence power output can be made larger.

The solar cell apparatus disclosure mentioned above has the structure shown in FIG. 1. The folding solar cell apparatus has flexible leads connecting solar cell devices. The flexible leads are reinforced by a protective cover that coats both sides of the leads making them difficult to damage. The surfaces of the solar cell devices are also coated with a protective cover.

The solar cell apparatus shown in FIG. 1 has the characteristic that since the leads 2 are flexible and can be used as hinges, the apparatus can be conveniently used in various applications. However, connection of the leads 2 is extremely labor intensive, and this structure has the drawback that efficient lead connection for inexpensive mass production is difficult. This is because both sides of the leads 2 are coated with a protective cover 4 after connection to solar cell device 1 terminals; then the surfaces of the solar cell devices are coated with a protective cover 5. Manufacturability is even worse if already complete solar cell devices 1 coated with a protective cover 5 are used and the devices are connected with leads 2. This is because the protective cover 5 on the solar cell devices 1 must be removed over the terminals, leads 2 must be connected to the terminals, and a protective cover 4 must be applied over both sides of the leads 2 and over the surface of the terminals. Processing difficulty is reflected in the manufacturing cost of the solar cell apparatus and limits its application.

The solar cell apparatus shown in FIG. 1 has the further drawback that the leads 2 are easily broken at their interface with each solar cell device 1. When adjacent solar cell devices 1 are folded up, the leads 2 bend with a small radius of curvature at their interface with each solar cell device 1. The leads 2 are coated with a flexible protective cover 4, but the solar cell devices 1 are coated with a stiff protective cover 5. At an interface with a solar cell device 1, the leads 2 have a discontinuous section which transitions from a deformable region to a non-deformable region and bending in this region easily damages the leads 2. The fact that the leads 2 are easily broken not only limits their application but also makes malfunctions due to open circuited leads common. Applications are limited because the apparatus cannot be used where the leads are repeatedly bent and flexed.

A further drawback of this apparatus is the difficulty in determining open circuits in the leads 2. This is because even though a lead 2 may be open circuited, the protective cover 4 on both sides of the lead 2 may not be broken. External visual inspection of a broken lead 2 may therefore show it to be connected. Further, since the leads 2 are flexible and free to deform elastically, a broken section of lead 2 as well as an unbroken section of lead 2 are both free to deform. For this reason it may be difficult to determine a lead 2 open circuit at the degree to which the lead 2 can deform. This a further cause of difficulty in determining open circuits in the leads 2.

It is the third object of this invention to present a flexible solar cell apparatus that can be manufactured efficiently and inexpensively in quantity. It is a further primary object of this invention to present a flexible solar cell apparatus in which open circuited leads are not only prevented but also are easy to determine in the unlikely event that they occur.

In a folding solar cell apparatus with flexible leads, lead bending is limited to a minimum radius of curvature. This is because lead bending with an extremely small radius of curvature results in failure to restore the original lead shape. In a folding solar cell apparatus with a plurality of solar cell devices connected with the ability to bend at their boundaries, it is desirable to allow folding with as small as possible a radius of curvature at the boundaries. This is because bending with a large radius of curvature does not allow the apparatus to fold into a thin shape. In particular, a solar cell apparatus with many interconnected solar cell devices which cannot be folded with a small radius of curvature at the leads has the drawback that it will be quite thick when folded.

It is thus another further object of this invention to present a solar cell apparatus in which the leads can bend with a small radius of curvature resulting in a thin folded shape, and while the leads are frequently bent, lead damage and poor connection can be markedly reduced.

The above and further objects and features of the invention will more fully be apparent from the following detailed description with accompanying drawings.

SUMMARY OF THE INVENTION

The battery charger of this invention comprises a battery charger unit which connects to batteries to charge those batteries, solar cells which are used as the power source to charge batteries, and connecting parts to electrically connect the solar cells and the battery charger. The battery charger unit is provided with a solar cell compartment for storing the solar cells when not in use, namely when batteries are not being charged.

First of all, the battery charger of this invention can charge batteries with solar cells and those solar cells can be stored in the solar cell compartment when the battery charger is not in use. The battery charger is therefore portable when the solar cells are stored within the battery charger unit.

The battery charger of this invention can also have a battery charger unit in the form of a carrying bag which can contain electrical equipment housing batteries. The bag is provided with a heat ventilating section to cool batteries during charging.

In this configuration of battery charger, electrical equipment housing batteries can be carried within the bag, which is the battery charger unit, making the system portable. In addition, by connecting the solar cells to the battery charger unit, the electrical equipment can be charged while inside the bag.

Further, because of the heat ventilating section provided in the bag, which is the battery charger unit, heat is not trapped within the bag and battery and electrical equipment degradation due to heating is prevented.

Finally, the structure of the present invention allows the solar cells, which charge the batteries, to fold up into a compact form for storage.

DETAILED DESCRIPTION OF THE INVENTION

Figure 1:
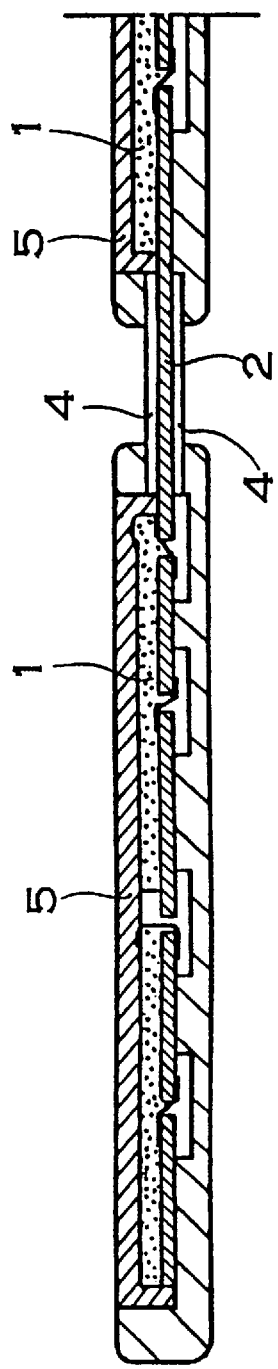
FIG. 1 is a cross-section view showing a prior art solar cell apparatus.
Figure 2:
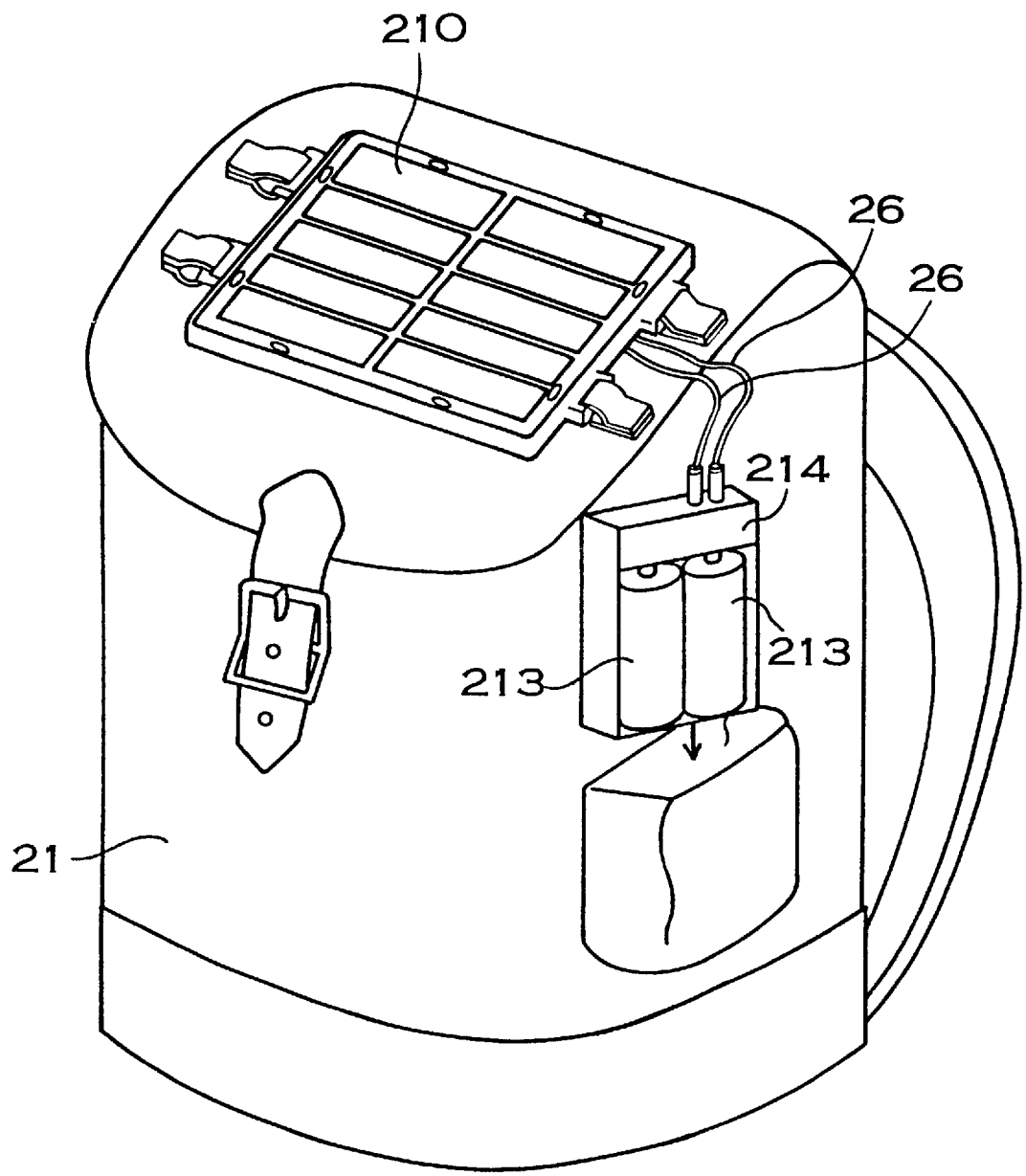
FIG. 2 is a perspective view of a prior art bag provided with a solar cell panel.
Figure 3:
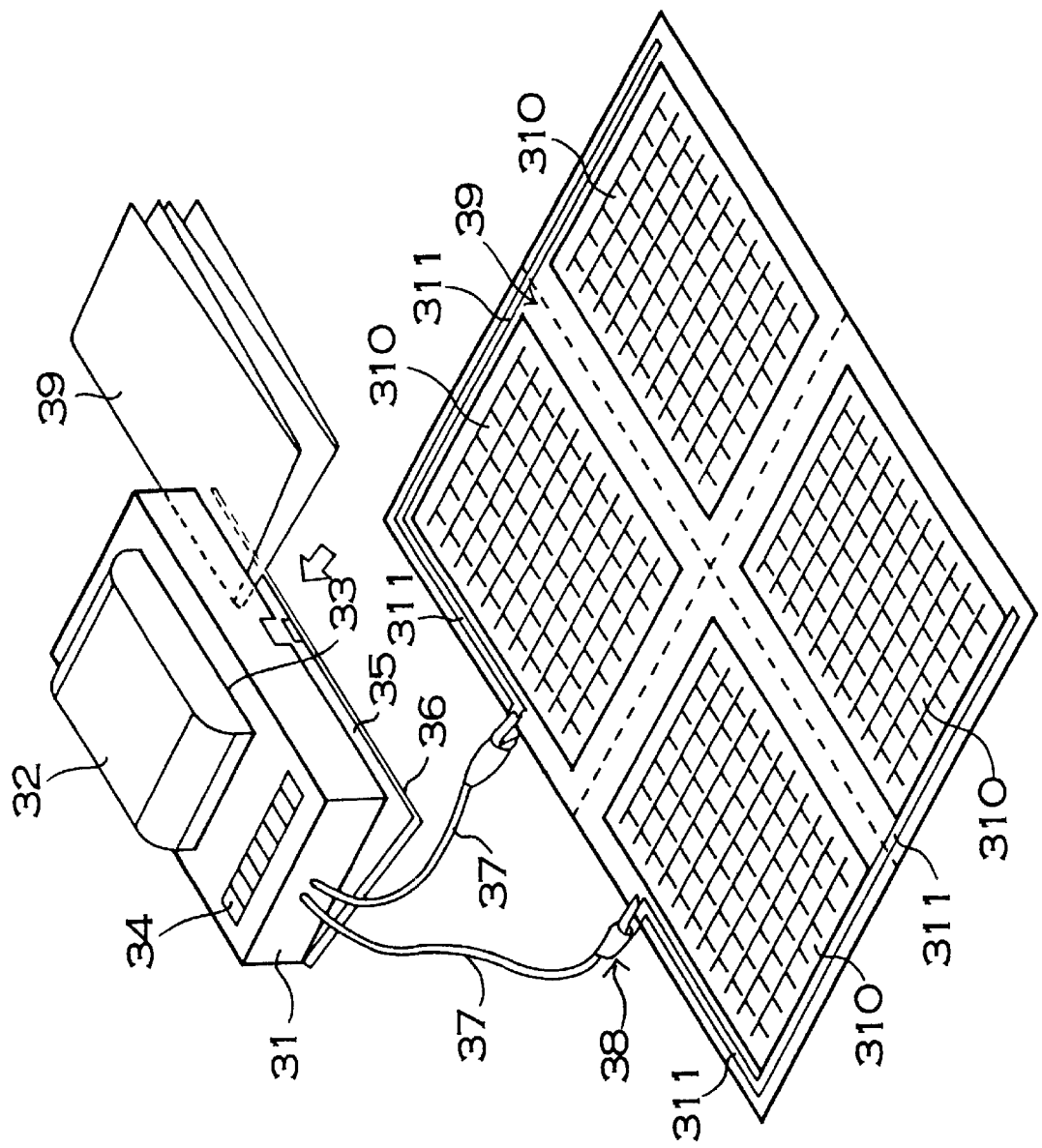
FIG. 3 is a perspective view showing an embodiment of the present invention.

Embodiments of the present invention are explained with reference to the drawings in the following. FIG. 3 is the first embodiment of the present invention. Part No. 31 is a battery charger unit and it has the shape of a rectangular solid. Part No. 32 is a battery pack which contains a plurality of rechargeable battery cells. The rechargeable batteries within the battery pack 32 are nickel-cadmium batteries, nickel-hydrogen batteries, lithium ion batteries, or other rechargeable batteries. The rechargeable batteries are typically 2 to 10 cells connected in series and parallel depending on the specifications of the electrical equipment used.

The battery charger unit 31 is provided with a battery mount section 33 and charge level indicator 34. The battery mount section 33 is recessed to accept battery pack 32 attachment and charging terminals which mate with battery contacts on the battery pack 32 which are provided on the recessed base-plane. The charge level indicator 34 is designed to integrate charging output from solar cells (described later) and illuminate LEDs. Various indicator methods are possible such as increasing the illuminated area as charging progresses and blinking the illumination when a battery pack is fully charged.

The battery charger unit 31 is also provided with a solar cell compartment 35 in its surface. The solar cell compartment 35 is a recessed region for stowing solar cells and is provided with a cover 36 which can be freely opened or closed.

The battery charger unit 31 also has a + and − pair of cables 37 which project out from a side of the unit. These cables 37 have connectors 38 attached at their ends to allow electrical connection to the solar cells. The output of the solar cells is supplied to the charging terminals of the battery mount section 33.

Part No. 39 denotes the solar cells. The solar cells 39 are four separate regions of amorphous silicon solar cell units 310 on the surface of an insulating film. All four amorphous silicon solar cell units 310 are connected in series, and connecting circuit lines 311 are laid down by conducting film printed on the insulating film. In FIG. 3, the ends of the lines 311 contact the connectors 38 to make electrical connection with the battery charger unit 31.

The solar cells 39 can be folded up as shown by the broken line section of FIG. 3. The folded solar cells 39 can then be stowed in the solar cell compartment 35. In this manner, the solar cells 39 can be spread open to increase their light receiving area for use in charging a battery pack 32, and can also be folded into a compact form to be stowed when not in use. Since the solar cells 39 are extremely thin, they are not very bulky when folded. Consequently, the solar cell compartment 35 can be made quite thin eliminating concern about a large battery charger unit 31.

The solar cells 39 may be made larger by increasing the number of amorphous silicon solar cell units. A plurality of solar cells 39 may also be connected electrically by cables or other connectors. In this fashion, solar cell output can easily be changed Consequently, even if the voltage or capacity requirements of batteries contained in the battery pack 32 change, the charging output can easily be revised to adapt to the new requirements.

Figure 4:
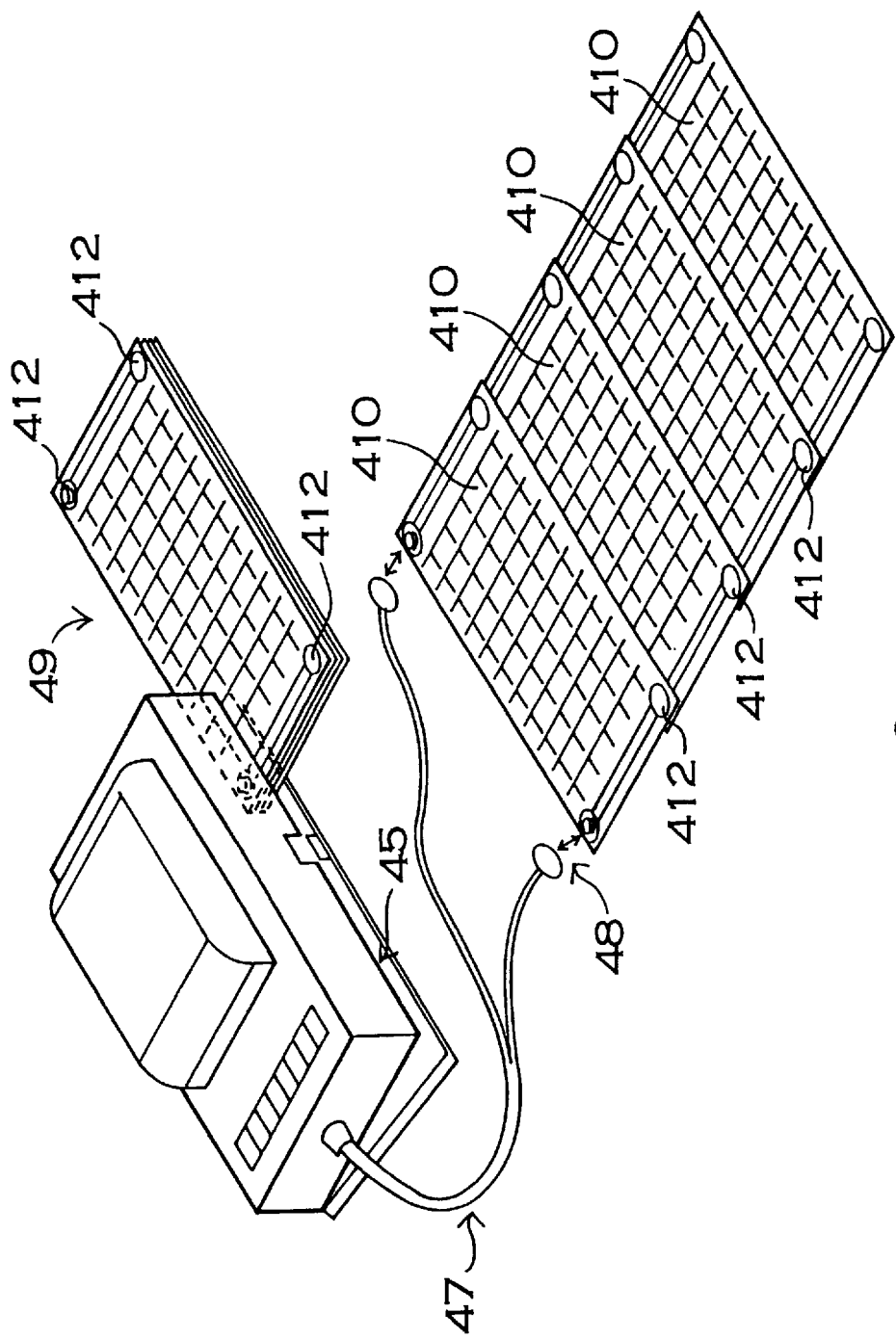
FIG. 4 is a perspective view showing another embodiment of the present invention.
Figure 5:
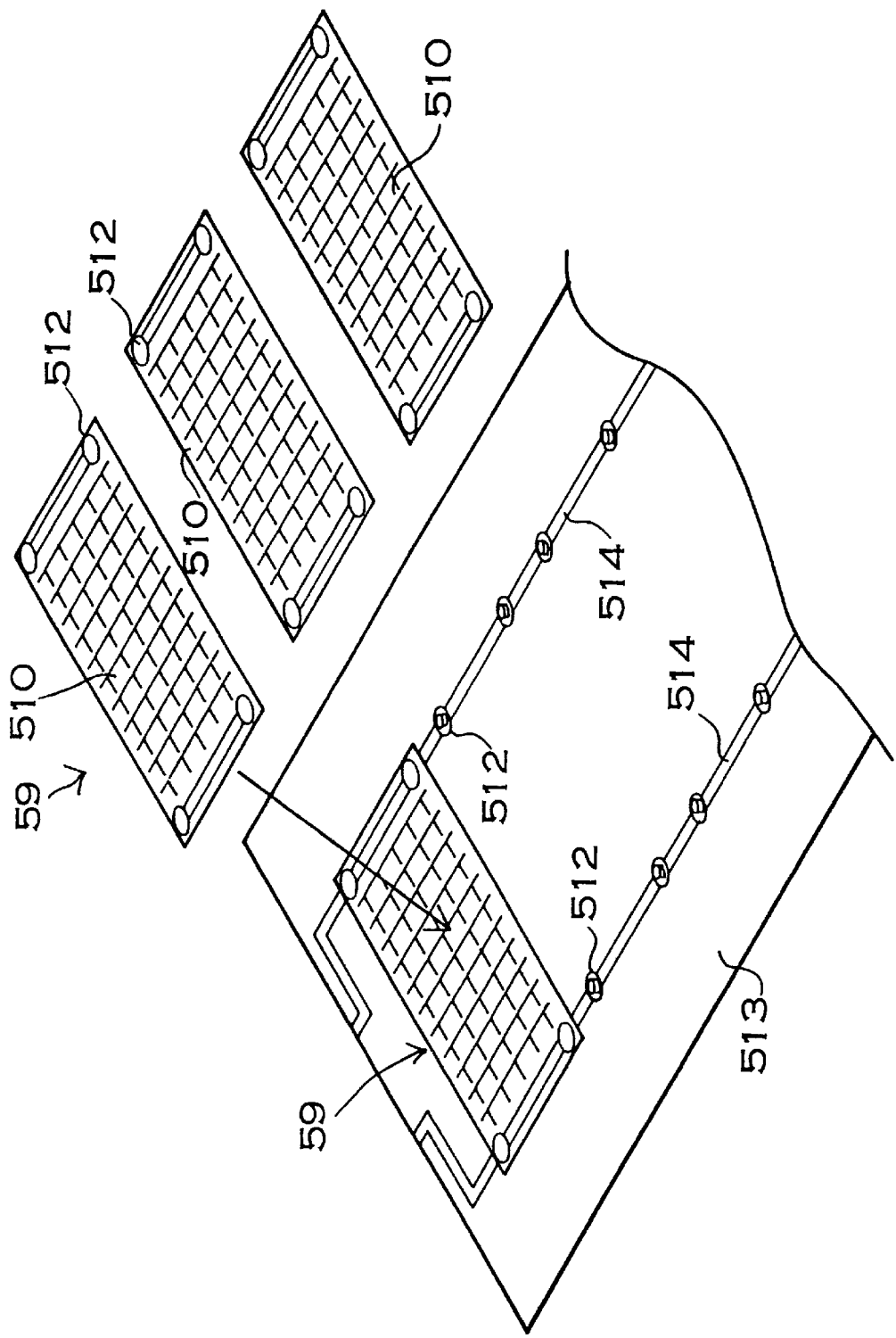
FIG. 5 is a perspective view showing another solar cell configuration of the present invention.
Figure 6:
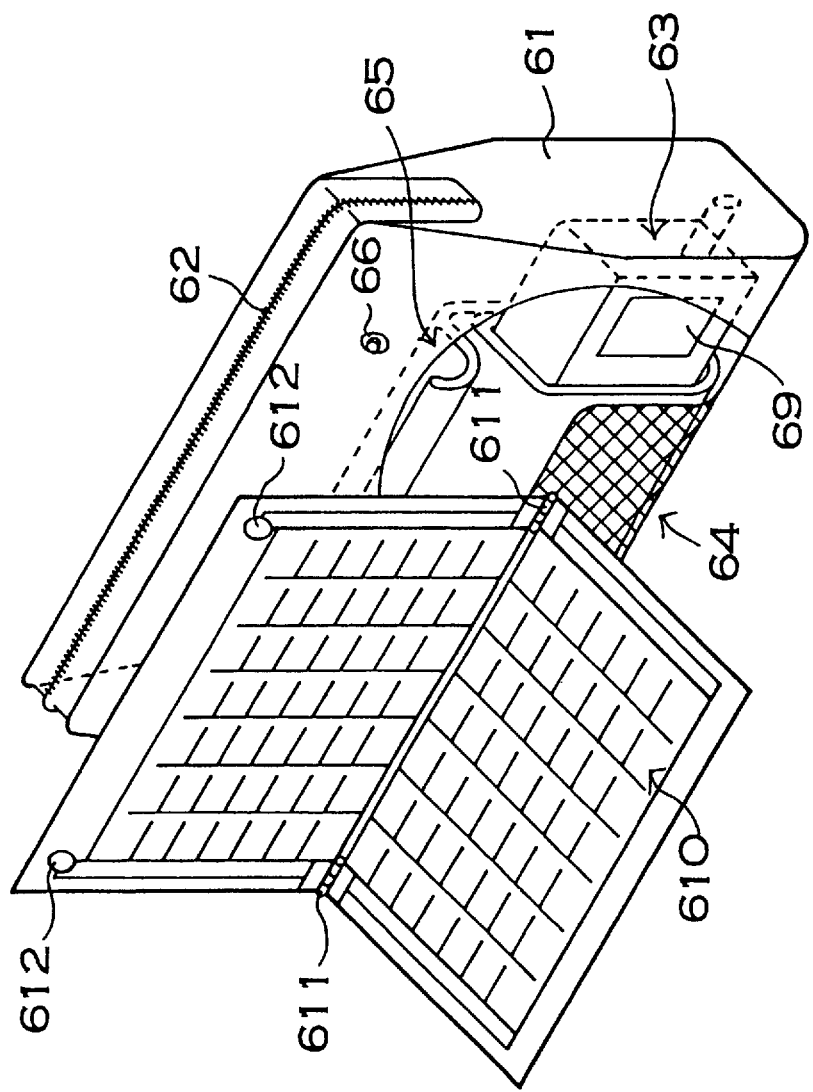
FIG. 6 is a partial cut-away perspective view showing a battery charger and solar cells of the present invention.
Figure 7:
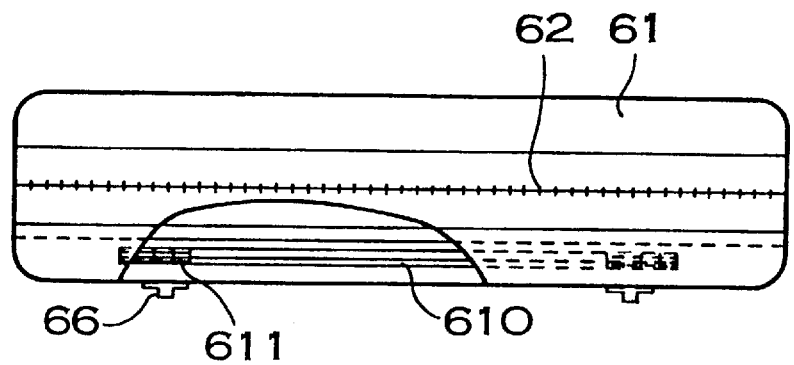
FIG. 7 is a partial cut-away top view of a battery charger of the present invention.

Turning to FIGS. 4 and 5, other embodiments of the present invention are shown. In FIG. 4, the solar cells 49 are initially divided into 4 sheets. Solar cell units 410 are formed on each of the solar cells 49. These solar cells 49 are interconnected both electrically and mechanically by conducting snap fasteners 412. The connectors 48 at the ends of the cables 47 are also snap fasteners 412 which connect to the solar cells 49. The snap fasteners 412 may be in the form of mating male and female pairs, clip type fasteners, ring shaped fasteners of the type that catch, or any other type of fasteners that make both electrical and mechanical connection.

Again, the 4 solar cells 49 fold together in a non-bulky compact form allowing them to be stowed in the solar cell compartment 45 when not in use. The number of solar cells 49 connected together in this embodiment may also be increased making it easy to change the solar cell output.

The solar cells 49 shown in FIG. 4 are connected in a single column via snap fasteners 412. However, the solar cells 49 are not limited to this arrangement and may be connected in various directions by providing many snap fasteners 412 around the periphery of each of the solar cells 49 for example. As a result, the overall layout of the solar cells 49 during charging can be changed to adjust to the available space or to the best position or angle to receive light.

When interconnecting solar cells via snap fasteners, an insulating film sheet 513 may also be used as shown in FIG. 5. The insulating film sheet 513 is initially printed with two rows of circuit lines 514 and fastener buttons 5 12 are provided on the lines 514. Solar cells 59 are connected one after another to these fastener buttons 512.

The battery charger of the present invention can also have a battery charger unit in the form of a carrying bag. The following describes such an embodiment. Turning to FIGS. 6 through 9, 61 is a battery charger unit which is a bag. The size of the bag is such that it can easily be held under an arm or in a hand. The top of the bag 61 is provided with a zipper fastener 62 and when the zipper fastener 62 is opened access is gained to the interior of the bag 61 for inserting items to be carried. The top of the bag 61 is narrow and the bottom of the bag is wide, and the interior space comprises an electrical equipment compartment 63 for stowing electrical equipment (described later). A heat ventilating section 64 is provided from the lower portion of the bag 61 sides to the bottom of the bag 61. The heat ventilating section 64 is made of mesh to allow good air flow. Magic Tape® 65 is provided in the electrical equipment compartment 63 for wrapping around and securing the electrical equipment.

Figure 8:
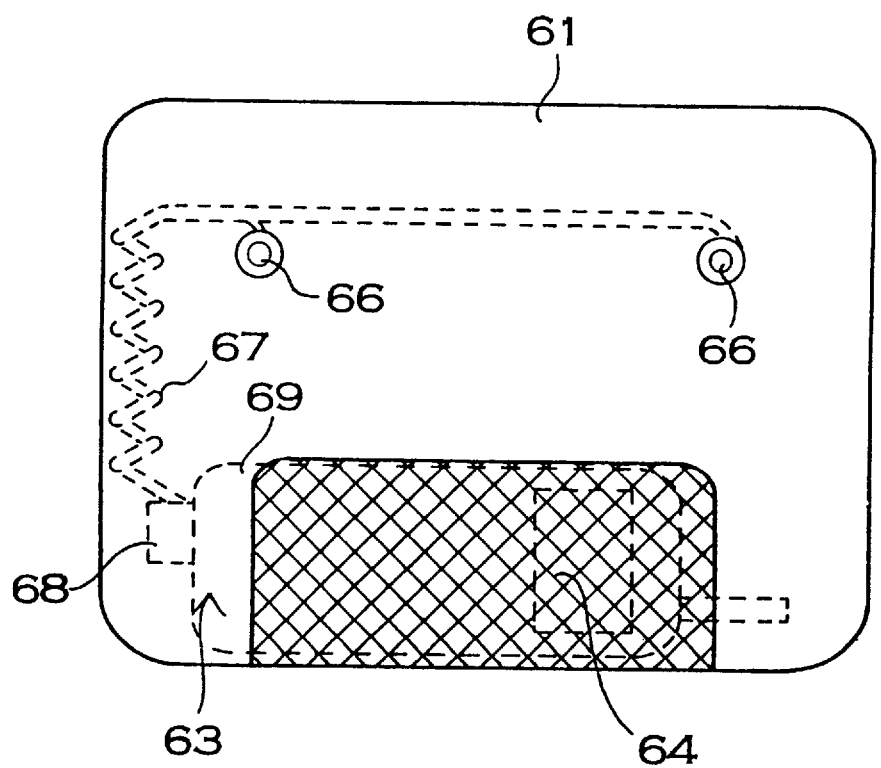
FIG. 8 is a side view of a battery charger of the present invention.
Figure 9:
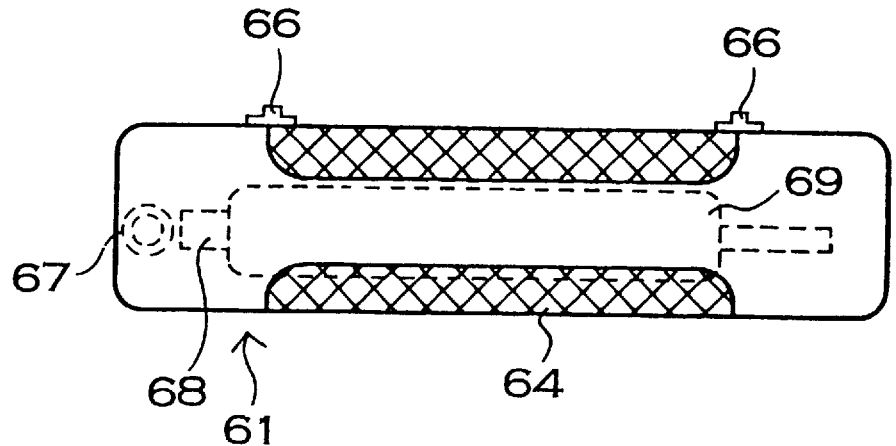
FIG. 9 is a bottom view of a battery charger of the present invention.

The side of the bag 61 is provided with a conducting pair of projecting button fasteners 66 exposed on the outer surface of the bag 61. The projecting button fasteners 66 pass through the side of the bag 61 and electrically connect with a charging cord 67 on the inside of the bag 61 (FIG. 8). The charging cord 67 is a coiled cord provided with a connector 68 at its end for connection to the electrical equipment.

Part No. 69 is a portable telephone which houses batteries such as nickel-cadmium batteries as its power source. The portable telephone 69 is provided with a connection section at its base for attachment of the above mentioned connector 68. The connection section is connected with the internal nickel-cadmium batteries and power input from outside the connection section is supplied to the nickel-cadmium batteries for charging.

When the portable telephone 69 is stowed in the electrical equipment compartment 63, it is held in a fixed position by magic tape 65. At this time the portable telephone 69 is held in a position which exactly corresponds to the heat ventilating section 64. As a result, temperature rise in the portable telephone 69 can be prevented, and to improve the effectiveness of the heat dissipation, the magic tape 65 can be made in the shape of a thin band.

Part No. 610 denotes the solar cells. The solar cells 610 have hinges 611 which allow the solar cells to bend in two. The solar cells 610 can be spread open or folded up and stowed. When the solar cells 610 are folded they become small enough to be stowed along with the portable telephone 69 in the battery charger unit, which is the bag 61.

The solar cells 610 have a plurality of cells arranged vertically and horizontally and all connected in series. The overall output from the solar cell panel is delivered by the conducting recessed button fasteners 612. The conducting recessed button fasteners 612 mate with the projecting button fasteners 66 on the side of the bag 61 when pushed together to make a snapping sound. This completes electrical connection of the solar cells 610 with the charging cord 67. As a result, direct current power generated by the solar cells 610 charges the nickel-cadmium batteries contained in the portable telephone 69. It is well known that when nickel-cadmium batteries are charged, they generate heat and rise in temperature as they near full charge. However, heat dissipation is provided by the heat ventilating section 64, and battery and equipment degradation due to temperature rise is prevented.

When disconnecting the mated recessed 612 and projecting button fasteners 66, they are easily released with a snapping sound by pulling on the recessed button fasteners 612. The disconnected solar cells 610 can be stowed inside the bag 61 for carrying, or when needed the solar cell panel 610 can be deployed for battery charging as described above.

This configuration of battery charger allows electrical equipment housing batteries to be stowed and carried. Further, the solar cell panel can be connected to the batteries while the electrical equipment is stowed. The batteries can thereby be charged by the solar cells.

Further, since the bag battery charger is provided with a heat ventilating section, heat is not allowed to build up inside and heat degradation of the electrical equipment and battery is prevented.

Still further, this type of battery charger can be carried anywhere with the electrical equipment stowed inside, and the internal batteries can be charged anywhere. Since charging can be accomplished with the electrical equipment stowed within the bag, there is little risk of having the electrical equipment stolen.

Figure 10:
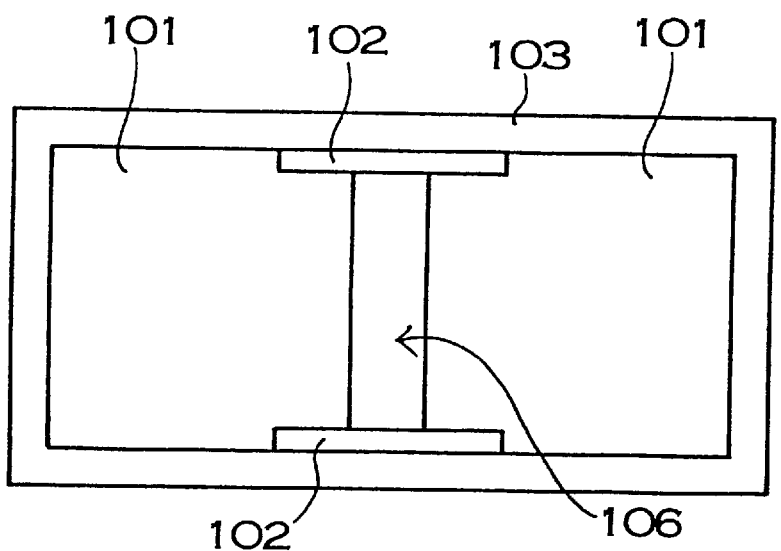
FIG. 10 is a plan view of bending solar cells of an embodiment of the present invention.
Figure 11:
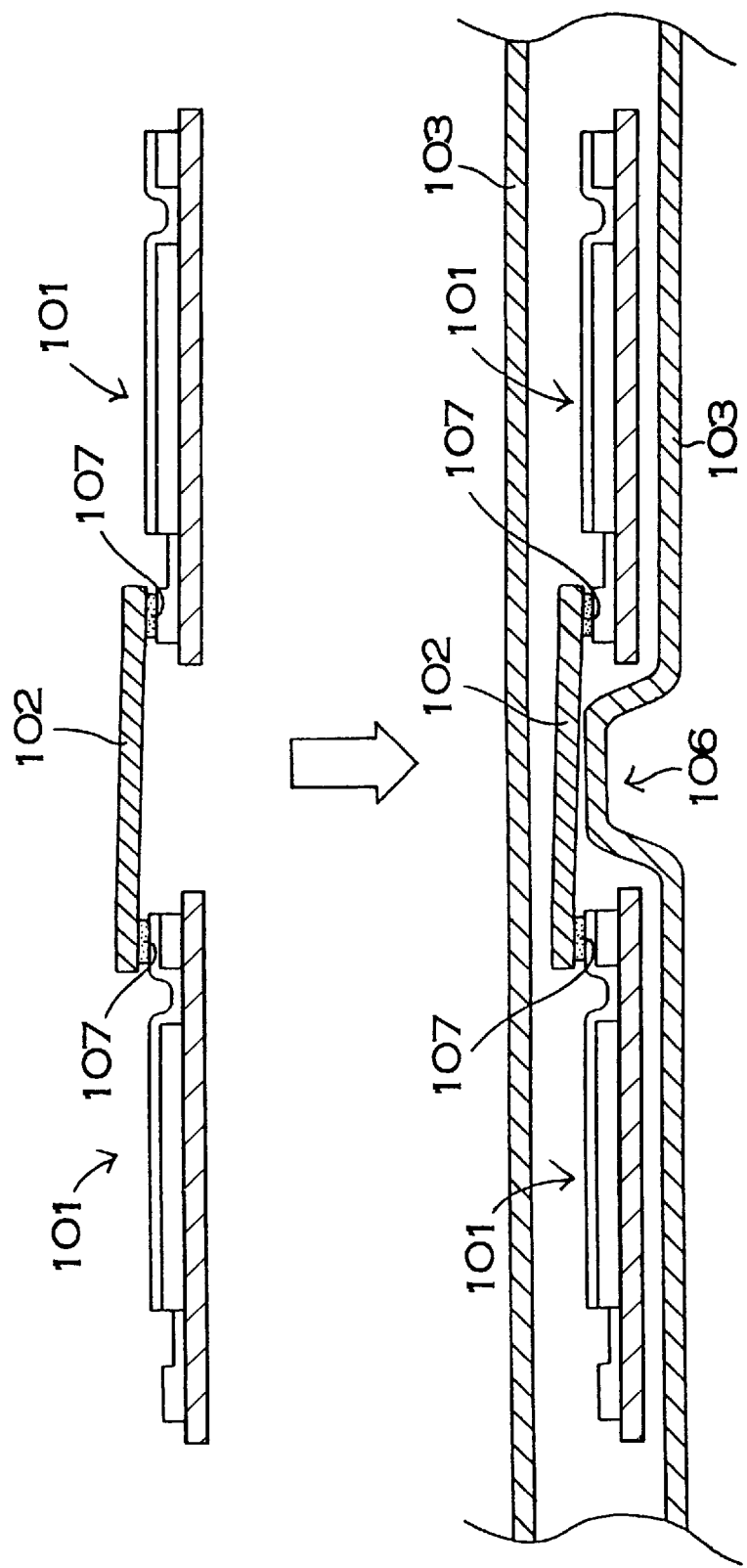
FIG. 11 is a cross-section view showing processing of bending solar cells of an embodiment of the present invention.

The following describes solar cells which can bend allowing them to be folded into a small compact form. The solar cells shown in the plan view of FIG. 10 and the processing cross-section of FIG. 11 are two solar cell units 101 connected by two leads 102 in a manner allowing it to bend.

The solar cell units 101 are devices which convert light into electricity. Although not illustrated, a laminate of back-side electrode, amorphous silicon (a-Si), and transparent top electrode (in that order) on top of an insulating substrate may be used, for example, as a solar cell unit 101. Since incident light does not pass through the insulating substrate, this layer does not need to be transparent. The insulating substrate is a plastic film such as polyimide film, PET, PEN, or acrylic film. Solar cells which use a plastic film insulating substrate have an overall sheet form which can bend randomly without breaking. However, the solar cells of the present invention may also use solar cell units of stiff unbending material.

Metal films such as Ag, Al, or Cu are used for the back-side electrode to allow bending. The back-side electrode is insulated from the transparent top electrode, is provided over the entire solar cell unit, and connects to charge collecting electrodes. The charge collecting electrodes are terminals which connect adjacent solar cell units. An aSi layer is deposited on top of the back-side electrode. The transparent top electrode is layered on top of the a-Si film. The transparent top electrode is a thin film that is both conducting and able to pass light. ITO and $SnO_2$ are used for the transparent top electrode. Charge collecting electrodes are provided on the top surfaces of the transparent top electrodes for connection with the leads. The charge collecting electrodes are a conducting epoxy such as Ag epoxy.

The charge collecting electrodes, which are the solar cell unit terminals, are connected to flexible leads by solder or conductive epoxy. In the solar cells shown in FIGS. 10 and 11, the solar cell units 101 are connected by leads 102 at both sides. Conducting cloth or metal foil such as copper or silver foil can be used for the flexible leads 102. Conducting cloth is conducting fibers or threads woven into cloth form and has excellent flexibility. Conducting fibers are plastic fibers coated with metallic film.

The solar cell units 101 with their terminals 107 electrically connected through leads 102 are covered on both sides by a flexible protective laminate film 103. The protective laminate film 103 covers both sides of the solar cell units 101 and the leads 102. Specifically, as shown in the cross-section of FIG. 11, the protective laminate film 103 that covers both sides of the leads 102 also extends over the surfaces of the solar cell units 101. Thus a single continuous protective laminate film 103 covers the surfaces of both the solar cell units 101 and the leads 102. The protective laminate film 103 which covers the solar cell units 101 and the leads 102 is attached to those surfaces by bonding adhesive or a low melting point plastic film is laminated onto the surfaces. In regions between the solar cell units 101 with no leads 102, both sides of the protective laminate film 103 are mutually bonded to form a strong flexible hinge 106.

Transparent plastic films such as PET, acrylic film, polyimide film, and PEN can be used as the protective laminate film 103 which covers the surfaces of the solar cell units 101 and leads 102. It is not required that the protective laminate film 103 which covers the back-side of the solar cell units 101 and leads 102 be transparent. However, the same protective laminate film 103 may be used to cover all surfaces.

The radius of curvature of the bending leads for the solar cells with the above configuration is made large by the following structures. In the solar cell plan view of FIG. 12 and the cross-section of FIG. 13, two pivot bars 128 are attached parallel to the center of rotation of bending above the leads 122, and flexible hinges 126 are attached to the bottom surface of the leads 122. The pivot bars 128 are cylindrical rods 0.5 mm to 2 mm in diameter. As shown in FIG. 14, leads provided with pivot bars 148 curve around those pivot bars 148 and thus bend with a radius of curvature approximately equal to the diameter of the pivot bars 148.

Therefore, the radius of curvature of the leads can be made larger by using fatter pivot bars 148. However, making the pivot bars 148 fatter also makes the connecting regions between solar cell units thicker. Consequently, the previously mentioned pivot bar diameters are optimum.

Figure 12:
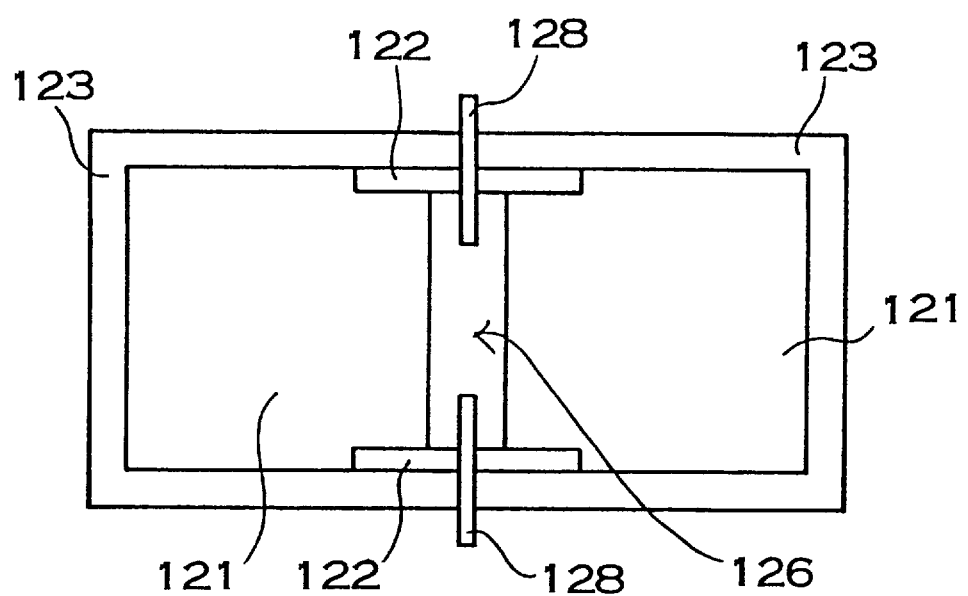
FIG. 12 is a plan view showing bending solar cells of another embodiment of the present invention.
Figure 13:
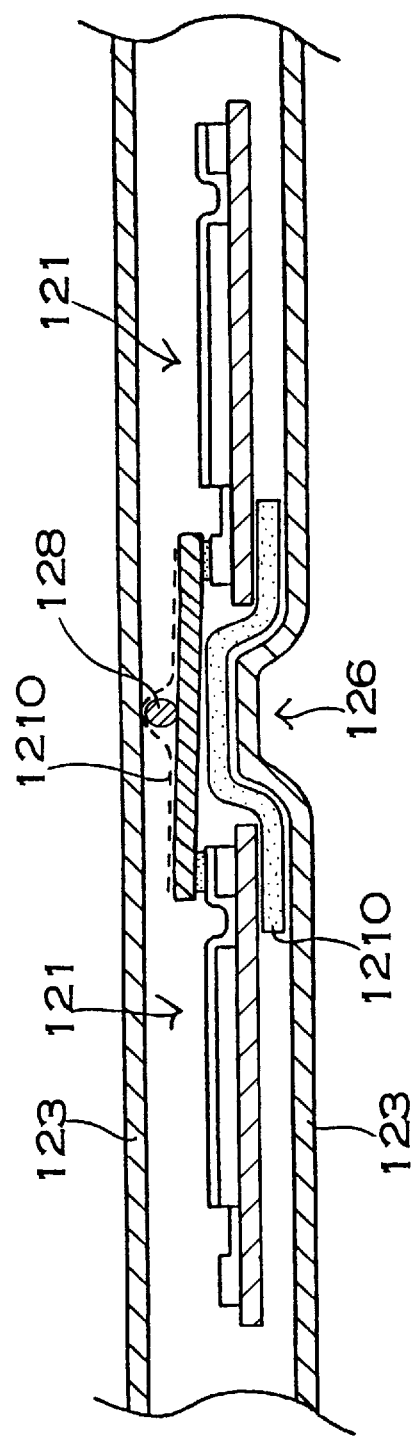
FIG. 13 is a cross-section view showing bending solar cells of another embodiment of the present invention.
Figure 14:
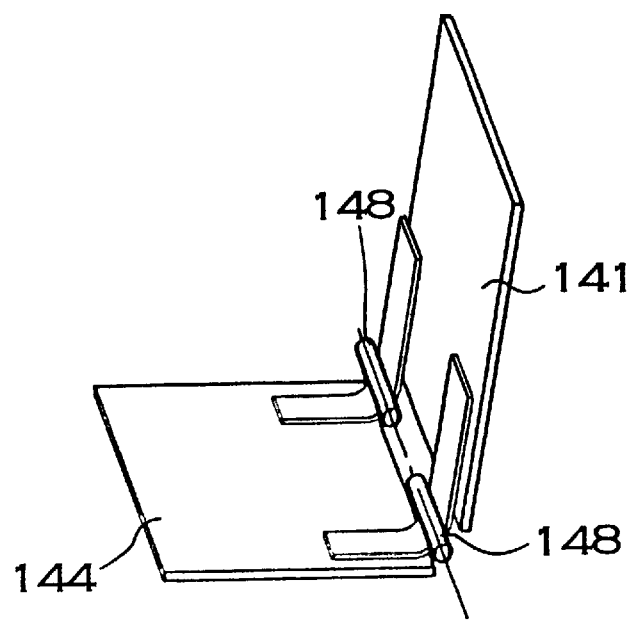
FIG. 14 is a perspective view showing pivot shaft connected solar cells in the bent state.

Metal or plastic cylindrical ro s can be used as the pivot bars 128 (FIGS. 12 and 13). Metal rods are cut into two pieces to avoid short circuiting the two leads 122. Since metal rods contact the leads 122, they may be exposed through the protective laminate film 123 and serve a dual purpose as output terminals. Solar cells which use the pivot bars as output terminals have no need for other single purpose output terminals. Although not illustrated, solar cells which do not use the pivot bars as output terminals are provided with output terminals on the solar cell units. Since plastic pivot bars do not short circuit the leads, a single plastic pivot bar can connect across all the leads (not illustrated). As shown in FIG. 13, a band of thin plastic adhesive film 1210 is attached over the top of the lead 122 and the pivot bar 128 to reliably attach a pivot bar 128 to the surface of a lead 122. The lead 122 and the attached adhesive film 1210 sandwich the pivot bar 128 to hold it in a fixed position.

Figure 15:
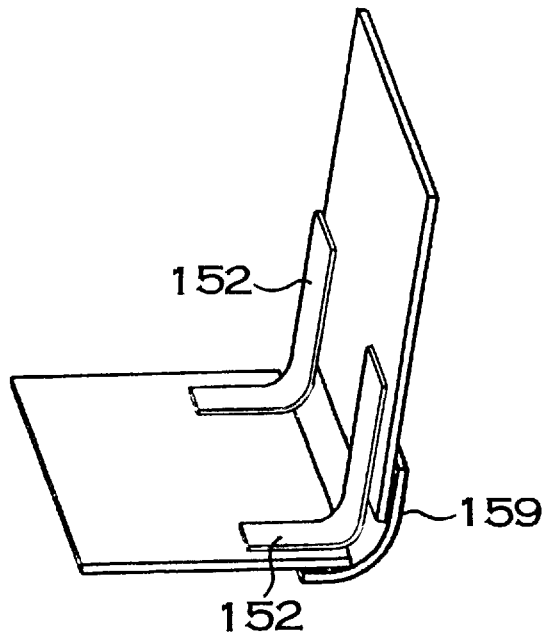
FIG. 15 is a perspective view showing solar cells in the bent state with a hinge sheet attached.

As shown in the solar cells of FIG. 13, a hinge sheet 129 is attached to the bottom surface of the lead 122 to further reinforce the bending interface of the solar cell units 121. Paper or plastic which can bend freely is used for the hinge sheets 129. As shown in FIG. 15, leads 152 with hinge sheets 159 attached to their back surfaces bend with a large radius of curvature making the leads 152 still more difficult to break.

Although the solar cells shown in FIG. 13 have both a pivot bar 128 attached to the front surface and a hinge sheet 129 attached to the back surface of the leads 122, lead breakage can be prevented by providing either a pivot bar or a hinge sheet.

As shown in FIG. 13, the leads 122 with pivot bars 128 and hinge sheets 129 attached have both surfaces covered by protective laminate film 123. This protective laminate film 123 is attached to all surfaces of the solar cell units 121 and the bending interface connecting solar cell units 121 in the same manner as in the solar cells shown in FIGS. 10 and 11.

Solar cells with this type of structure have the feature that they can be efficiently and inexpensively manufactured in quantity. This is because the protective laminate film which covers both sides of the leads extends over the solar cell unit surfaces allowing a single continuous protective laminate film to cover the surfaces of both the solar cell units and the leads. In particular, there is no need to locally remove a protective covering on a region of a solar cell unit prior to lead attachment in this type of solar cell. The leads can simply be attached prior to covering the solar cell units with protective laminate film for efficient mass production.

Further, since the solar cell units and leads are covered by single continuous protective laminate film, material properties at the solar cell-lead interface do not change suddenly. For this reason, when the leads are bent, the solar cell-lead interface does not bend with an extremely small radius and lead beaks in this region are effectively prevented. This structure therefore has the feature that lead open circuits are drastically reduced and these solar cells can be used for applications which frequently bend the leads.

Since the front side of the solar cell units and leads are covered by a single transparent protective laminate film, solar cells of this type are also provided with the feature that in the unlikely event of lead breakage, the break can be found easily. This is because the condition of the leads can be observed externally through the transparent protective laminate film.

The following describes improved structures for bending solar cells. The solar cells shown in the plan view of FIG. 16, the exploded oblique view of FIG. 17, and the bending lead region enlarged plan view of FIG. 18 comprise two solar cell units 161 connected by two sets of bending leads 166.

The solar cell units 161 are devices which convert light into electricity. Flexible leads 166, which are free to bend, are connected to collecting electrodes 163, which are the solar cell unit 161 terminals. The solar cells shown in the FIGS. 16, 17 and 18 have + and − connected on both sides of the solar cell units 161. The flexible leads 166 electrically connect the two solar cell units 161 and mechanically connect them in a manner allowing them to fold. The flexible leads 166 must be solidly anchored to the solar cell units 161 in addition to connecting their collecting electrodes 163. Adhesive bond is therefore applied to the region of the flexible leads 166 that mates with the solar cell units 161. Epoxy resin, urethane resin, silicone resin, unsaturated polyester resin, or other resins may be used as the adhesive bond.

The flexible leads 166 are provided with a first lead 166A, a second lead 166B, and a coil spring 167 to realize a flexible connection. For example, the first lead 166A and the second lead 166B are metal plated metal rods 0.3 mm to 1 mm in diameter. The metal plating is a corrosion resistant metal such as gold, silver, or chromium. The first lead 166A and the second lead 166B are connected to the collecting electrodes 163 of adjacent solar cell units.

The metal rod of each first lead 166A is bent into a C-shape with a central pivot region 168 and both ends bent inward. The inward bent ends are connected to a collecting electrode 163 on a solar cell unit 161. The C-shaped first lead 166A has the feature that the coil spring 167 does not slide off the central pivot region 168. This is because both ends of the coil spring 167 are positioned at the ends of the central pivot region 168 of the C-shaped first lead 166A. The first lead 166A is connected to a solar cell unit 161 such that the central pivot region 168 is positioned at the pivot line when adjacent solar cell units 161 are folded. Central pivot regions 168 of first leads 166A connected to + and − collecting electrode 163 are aligned along a straight line coincident with the solar cell pivot line.

Figure 19:
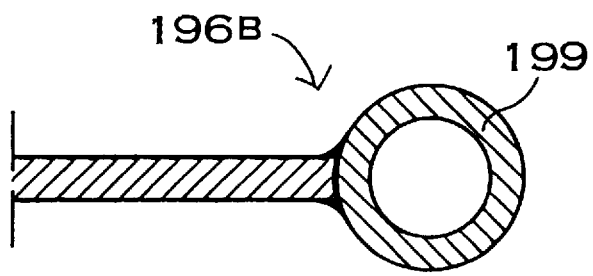
FIG. 19 is a cross-section view of flexible leads.
Figure 20:
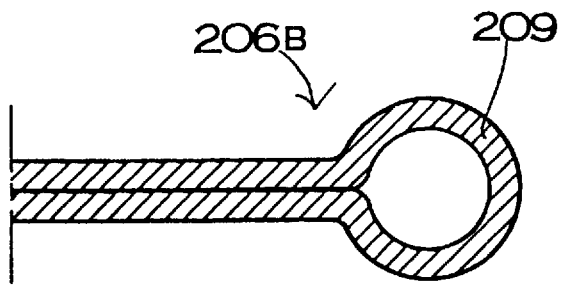
FIG. 20 is a cross-section view of another embodiment of flexible leads.

The second lead 166B has a hollow cylinder 169 at one end for insertion of the central pivot region 168 of the first lead 166A. FIGS. 19 and 20 show second lead cross-sections. The second lead 196B of FIG. 19 has a cylinder 199, which is a metal pipe, connected to its end by a method such as soldering or welding. The second lead 206B of FIG. 20 is a metal strip folded back on itself at the middle. The cylinder 209 is the region that is folded back at the middle and the double thick regions of the second lead 206B are held together by soldering or welding.

The central pivot region 168 of the first lead 166A inserts with the coil spring 167 into the cylinder of the second lead. Consequently, the inner diameter of the cylinder 169 is designed larger than the outer diameter of the central pivot region 168. The sizes of the cylinder 169 and the central pivot region 168 are designed to allow free rotation with the coil spring inserted in between.

The coil spring 167 is elastically deformable thin conducting metal wire wound into a coil shape. The coil spring 167 deforms elastically to electrically contact the central pivot region 168 of the first lead 166A and the cylinder 169 of the second lead 166B. The coil spring's inner surface contacts the outer surface of the central pivot region 168 of the first lead 166A and the coil spring's outer surface contacts the inner surface of the cylinder 169 of the second lead 166B. The coil spring 167 is wound to a diameter that enables electrical contact with the first lead 166A and the second lead 166B. Ideally, the inside diameter of the coil spring 167 is slightly larger than the outside diameter of the central pivot region 168, and the outside diameter of the coil spring 167 is slightly smaller than the inside diameter of the cylinder 169. The central pivot region 168 is easily inserted through the coil spring 167.

Figure 16:
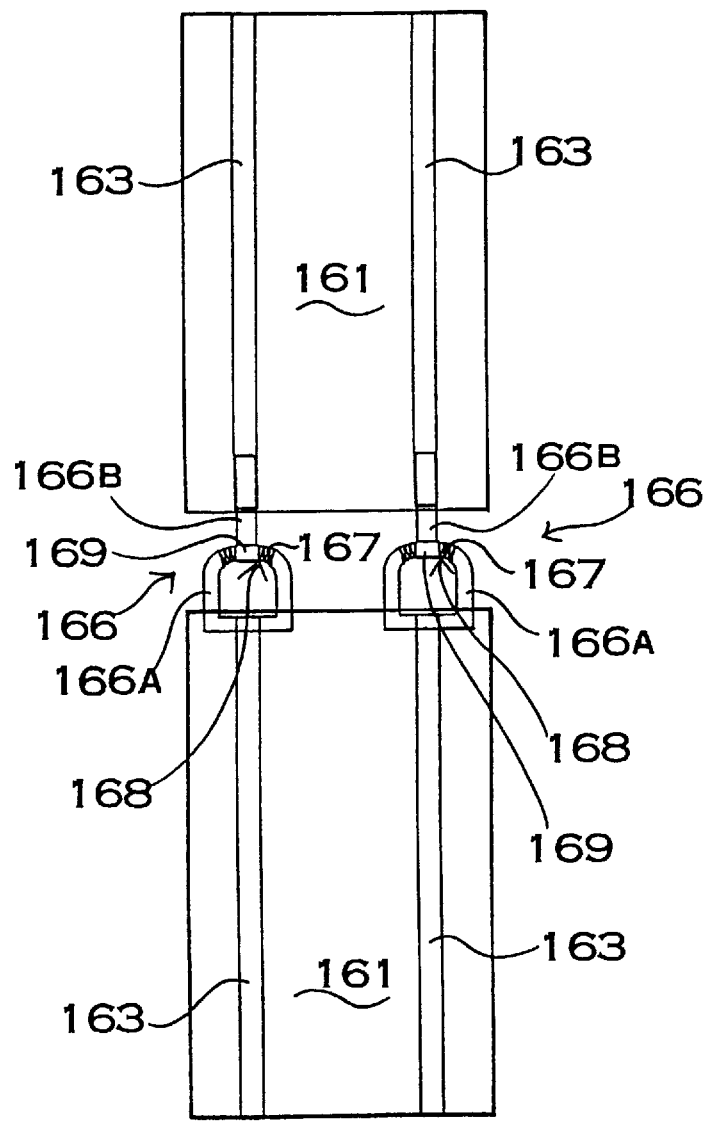
FIG. 16 is a plan view showing bending solar cells of another embodiment of the present invention.
Figure 17:
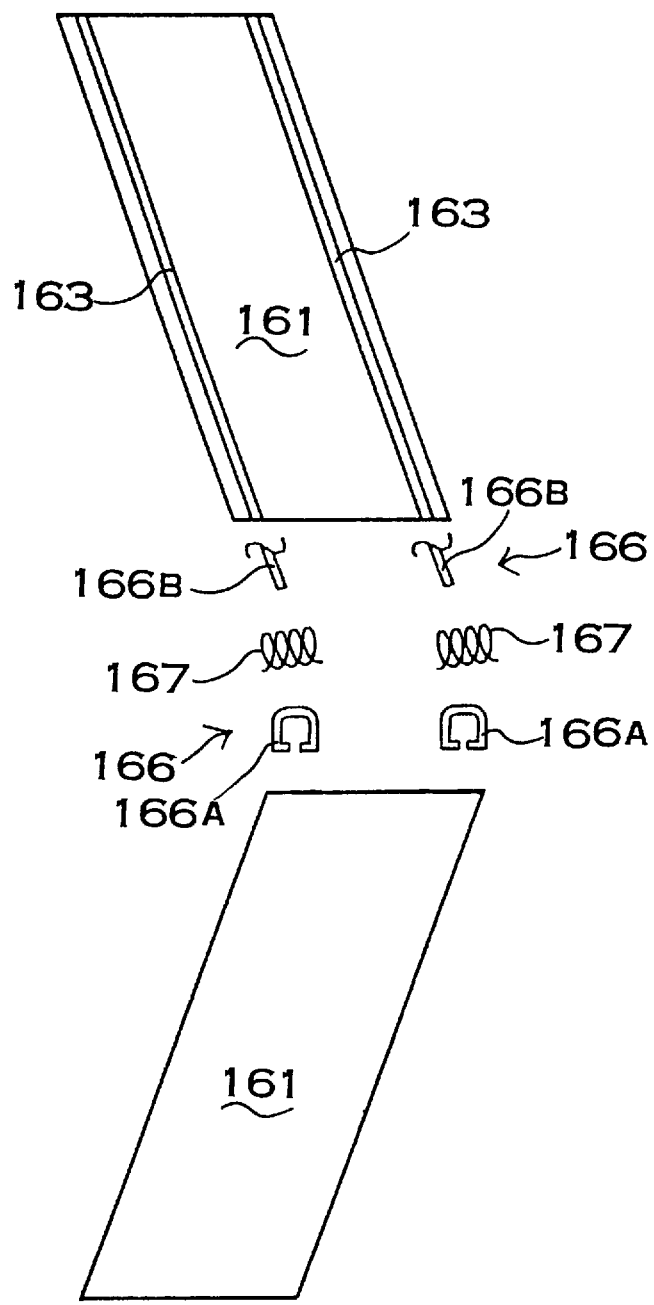
FIG. 17 is an exploded perspective view of the solar cells shown in FIG. 16.
Figure 18:
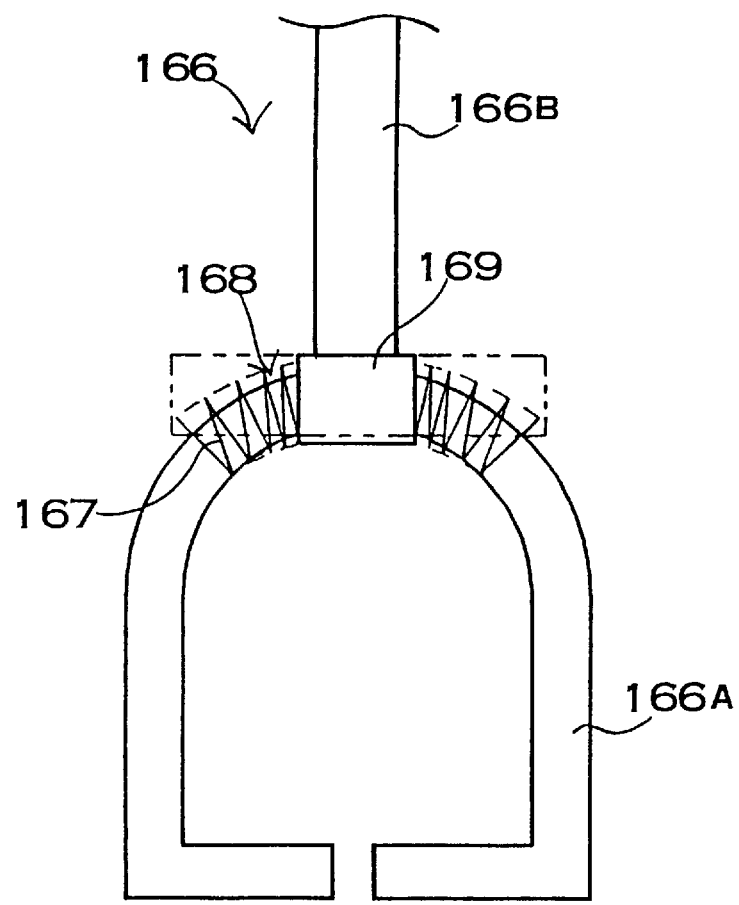
FIG. 18 is an enlarged plan view of the flexible lead section of the solar cells shown in FIG. 16.

As shown in FIG. 18, the coil spring 167 is also curved by the central pivot region 168 of the first lead 166A. For this reason, a bending force is exerted on the coil spring 167 trying to return it to its original shape shown by the broken lines in FIG. 18. Both ends of the coil spring 167 thereby flexibly press against the central pivot region 168, and the center region of the coil spring presses against the cylinder 169. Elastic pressure applied on the central pivot region 168 and the cylinder 169 by the coil spring 167 reduces contact failure between the first lead 166A and the second lead 166B. As shown in FIG. 16, the length of the coil spring 167 is designed such that both ends can extend to the curved ends of the central pivot region 168.

As shown in FIG. 16, sliding of the flexible leads 166 in the direction of the pivot line is prevented by the C-shape of the first lead 166A. For this reason, additional structures to prevent side wards sliding in the connecting region is unnecessary.

Figure 21:
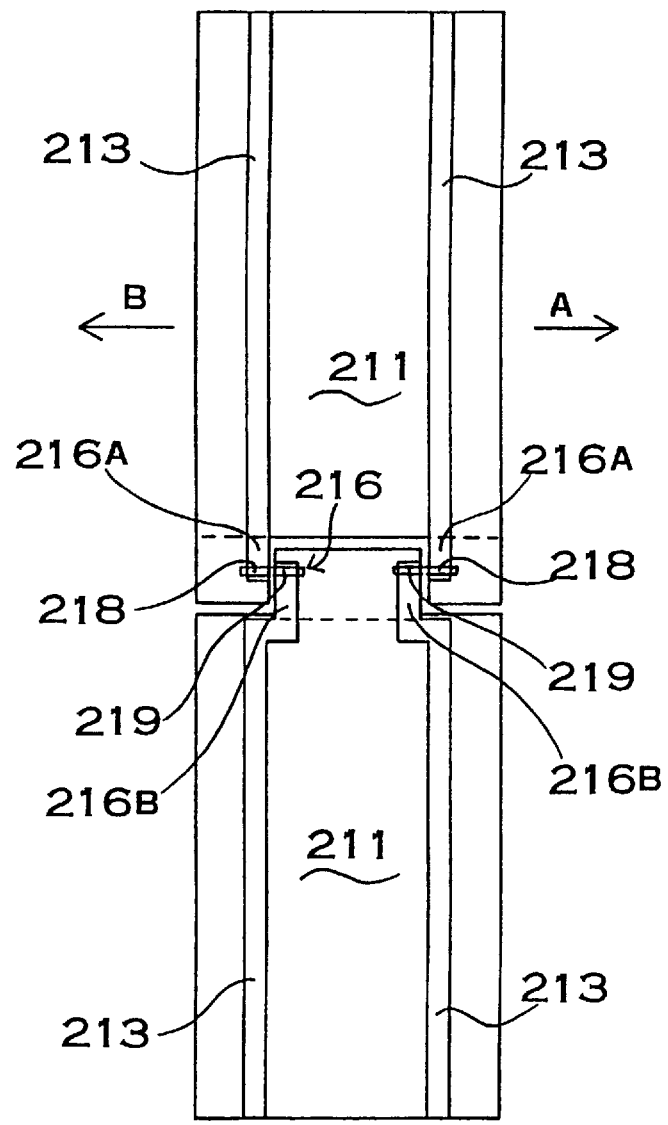
FIG. 21 is a plan view of still another embodiment of the solar cells of the present invention.
Figure 22:
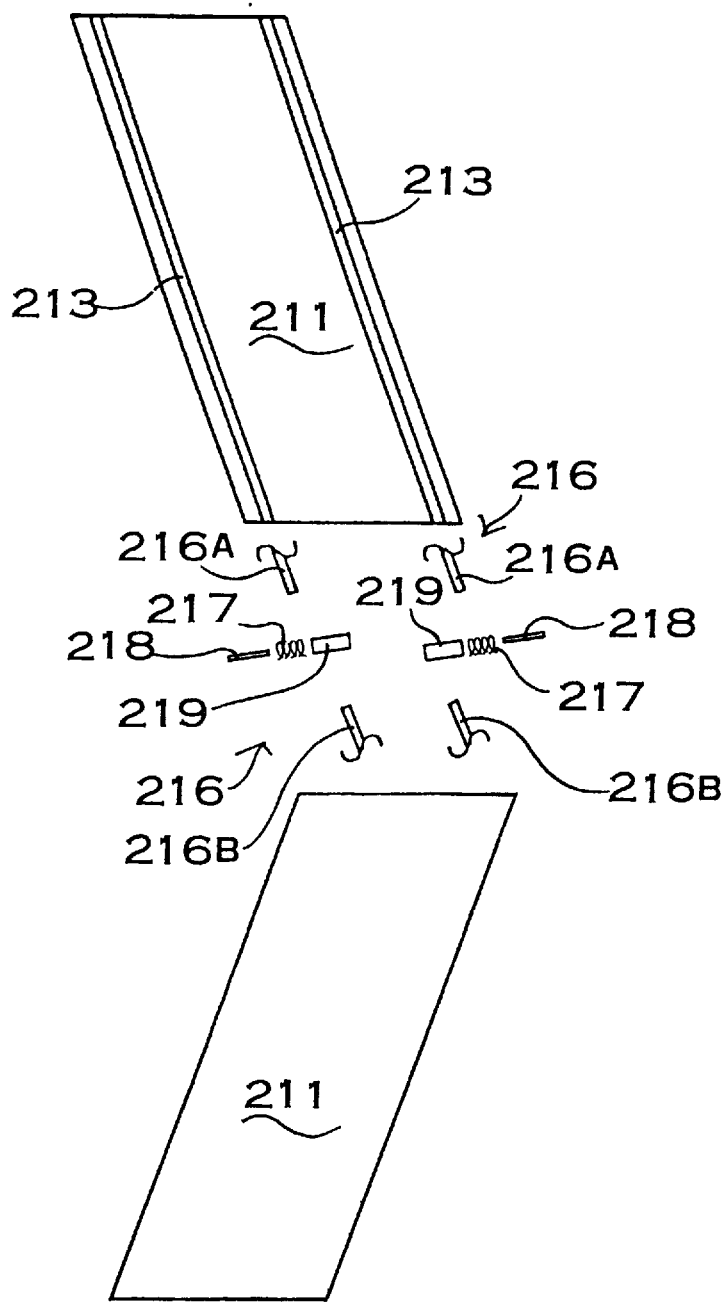
FIG. 22 is an exploded perspective view of the solar cells shown in FIG. 21.
Figure 23:
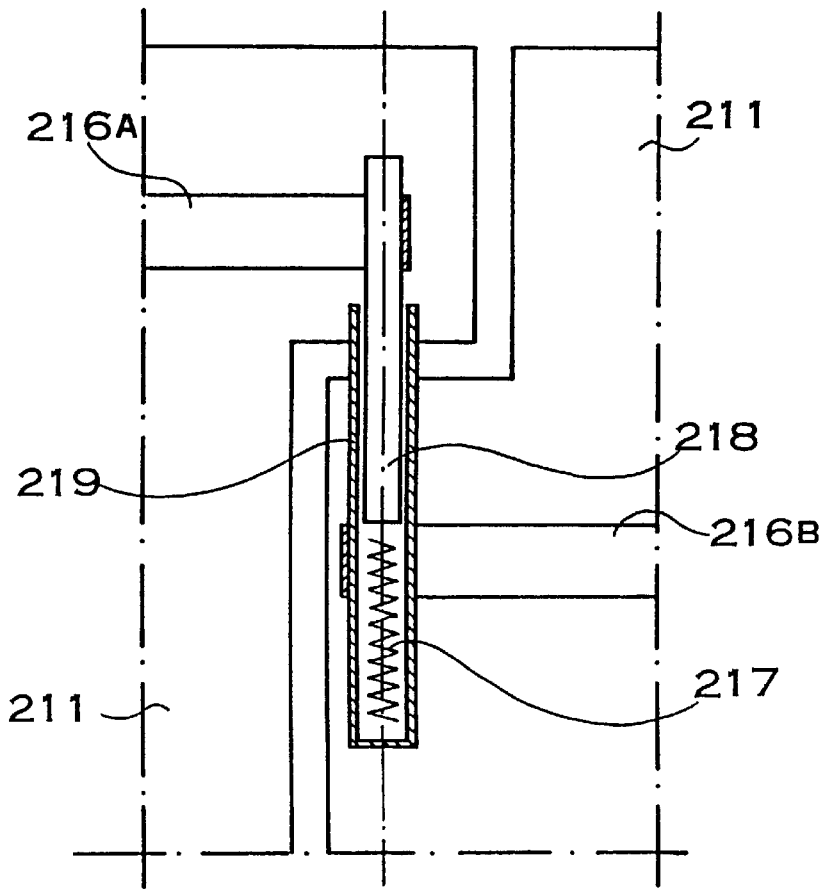
FIG. 23 is an enlarged cross-section view of the flexible lead section of the solar cells shown in FIG. 21.

The solar cells shown in the plan view of FIG. 21, the exploded oblique view of FIG. 22, and the bending lead region enlarged plan view of FIG. 23 comprise two solar cell units 211 connected by two sets of bending leads 266. The solar cell units 211 in these figures are the same as those shown in FIGS. 16 and 17.

In the solar cells shown in FIGS. 21 and 22, the solar cell units 211 extend into the connecting regions of the flexible leads 216 for sturdy attachment of the first lead 216A and the second lead 216B to the solar cell units 211. Referring to FIG. 21, the upper solar cell unit 211, which connects with the first lead 216A, has both sides of its lower edge extended, and the lower solar cell unit 211, which connects with the second lead 216B, has the center section of its upper edge extended. The recessed section in the lower edge of the upper solar cell unit 211 is positioned to align with the projecting section in the upper edge of the lower solar cell unit 211 to keep the extended regions from hitting. This structure allows the rod section 218 of the first lead 216A and the cylinder section 219 of the second lead 216B to be fixed directly to the surface of the solar cell units 211 for a sturdy attachment structure. However, as shown by the broken lines in FIG. 21, the interface edges of the solar cell units 211 can also be straight lines with the flexible leads 216 extending out from the solar cell units 211 for connection of each rod section 218 and cylinder section 219.

The flexible leads 216 in these figures have the same structure as measurement probes for printed circuits. Measurement probes are off-the-shelf parts available for applying elastic pressure to printed circuit board locations for electrical connection. Measurement probes are used for measurement pins on printed circuit board testing and inspection equipment. Measurement probes have a metal rod inserted in a hollow metal cylinder with a coil spring contained between the metal rod and cylinder. The coil spring acts flexibly to eject the metal rod as well as to make electrical connection between the rod and cylinder.

The flexible leads 216 of the solar cells shown in FIGS. 21 to 23 comprise a first lead 216A provided with a rod section 218 and a second lead 216B provided with a cylinder section 219 for insertion of the rod section 218 allowing a flexible connection. The first lead 216A has a metal rod, which is the rod section 218, connected to a lead line. The second lead 216B has a hollow metal cylinder, which is the cylinder section 219, connected to a lead line. Ideally, the metal rod section 218 and cylinder section 219 are plated with a corrosion resistant metal such as gold, silver, or chromium. The rod section 218 and cylinder section 219 are connected to lead lines by an attachment method such as soldering or welding.

The apparatus shown in the figures has two sets of flexible leads 216 for a connection that allows bending. Solar cells with two sets of flexible leads 216 have the + and − collecting electrodes 213 of the solar cell units 211 connected in parallel. Solar cells with solar cell units connected in series can be connected with one flexible lead 216 set. Two sets of flexible leads 216 prevents sliding of the connecting region in the direction of the bending axis. Referring to FIG. 21, the right flexible lead 216 prevents the upper solar cell unit 211 from sliding in the direction of arrow A. The left flexible lead 216 prevents the upper solar cell unit 211 from sliding in the direction of arrow B.

Figure 24:
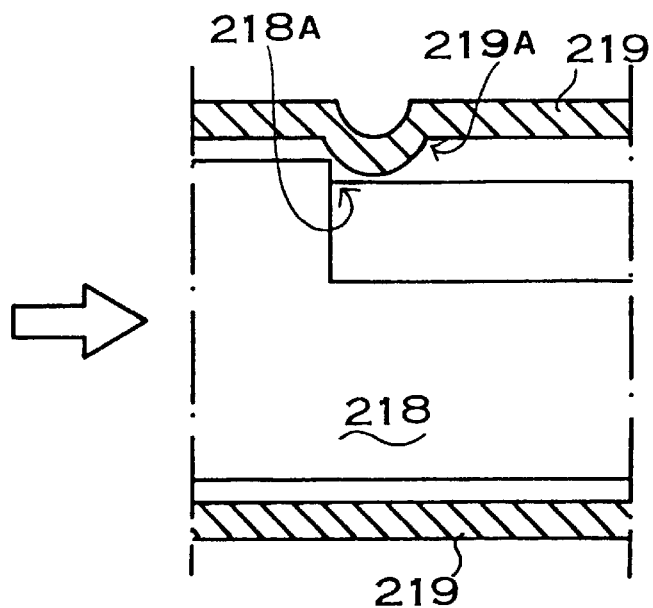
FIG. 24 is an enlarged cross-section view of important parts of the flexible lead section shown in FIG. 23.

As shown in FIG. 24, the measurement probe structure used for the flexible leads comprises a metal rod inserted in a hollow metal cylinder in a manner preventing its withdrawal. A structure which does not allow withdrawal of the metal rod from the metal cylinder prevents sliding in the direction of the probe axis. To prevent withdrawal of the rod section 218, which is a metal rod, from the cylinder section 219, which is a metal cylinder, a projection 219A is provided on the inside wall of the cylinder section 219 and a slot 218A, in which the projection 219A can slide, is provided in the rod section 218. Referring to FIG. 24, when the rod section 218 is pushed in the direction of arrow C by a coil spring, the projection 219A hits the end of the slot 218A preventing sliding in the direction of arrow C. The rod section 218 can slide in a direction opposite that of arrow C but this slippage is prevented by the other flexible lead 216.

The two sets of rod sections 218 of the first leads 216A are aligned on the bending line of the solar cell units 211. The solar cell units 211 are folded around a center line through the rod sections 218. The cylinder sections 219 of the second leads 216B are positioned to allow insertion of the rod sections 218. Electrical connection is made when the rod sections 218 of the first leads 216A are inserted in the cylinder sections 219 of the second leads 216B. Consequently, the inner diameter of the cylinder section 219 of a second lead 216B is designed approximately equal to the outer diameter of the rod section 218 of a first lead 216A for connection with no space between rod and cylinder. A flexible lead 216 with the same structure as a measurement probe does not have a coil spring 217 disposed between the outer surface of the first lead 216A and the inner surface of the second lead 216B as in the apparatus of FIG. 16. As shown in FIG. 23, the coil spring 217 is disposed between the end of the rod section 218 of the first lead 216A and the end of the cylinder section 219 of the second lead 216B. Consequently, there is no reason to provide space for the coil spring 217 between the outer surface of the rod section 218 of the first lead 216A and the inner surface of the cylinder section 219 of the second lead 216B.

The coil spring 217 is contained inside the cylinder section 219 of the second lead 216B. The cylinder section 219 has the shape of a hollow cylinder with a bottom surface to hold the coil spring 217 without allowing it to escape. The coil spring 217 has an outside diameter smaller than the inside diameter of the cylinder section 219 to allow it to expand and compress within the cylinder section 219 of the second lead 216B. When the cylinder projection 219A hits the end of the rod slot 218A, the coil spring 217 pushes resiliently against the rod section 218 electrically connecting the rod section 218 and the cylinder section 219. The ends of the coil spring 217 push against the rod section 218 and the cylinder section 219 to electrically connect the first lead 216A and the second lead 216B. Further, when the cylinder projection 219A hits the end of the rod slot 218A, the coil spring 217 causes the rod section 218 to incline slightly within the cylinder section 219 also electrically connecting the first lead 216A and the second lead 216B.

Solar cells with this configuration have the outstanding feature that the leads bend with an extremely small radius of curvature allowing the solar cells to fold into a thin shape. They also have the feature that lead damage and poor lead contact is reduced to the extreme even when the leads are bent frequently. This is because the rod section of the first lead inserts into the cylinder section of the second lead and both the rod and cylinder sections are resiliently pressed against by the coil spring. In the solar cells of the present invention, resilient deformation of the coil spring provides electrical connection between the rod section of the first lead and the cylinder section of the second lead. In particular, regardless how many times the solar cells are repeatedly folded, the coil spring resiliently presses against the rod and cylinder sections and oxidation and contaminants on the surfaces of the contact regions are removed to drastically reduce contact problems. Still further, when the solar cell units are folded or unfolded, the regions of electrical contact through the coil spring slide along the pivot line. The rod section and the cylinder section thus make distributed electrical contact over a wide region rather than local contact in a small area. This reduces friction between the rod section and the cylinder section and reduces contact problems.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A solar cell apparatus having solar cells comprising:
   (1) flexible leads which electrically connect the solar cells;
   (2) pivot rods which connect to the flexible leads along a folding line; and
   (3) protective laminate film which covers the surfaces of the flexible leads, the solar cells, and the pivot rods.

2. The solar cell apparatus as recited in claim 1 wherein the pivor rods are metal rods which project through the protective laminate film to serve the additional purpose as output terminals.

3. The solar apparatus as recited in claim 1, wherein hinge sheets are attached to the flexible leads.

4. A solar cell apparatus having solar cells wherein the solar cells are connected by flexible leads in a manner allowing folding, each flexible lead is provided with a first lead, a second lead, and a coil spring, and characterized in that:
   (1) the first lead and the second lead are connected to the solar cells;
   (2) the first lead has a rod section positioned on a folding line created when the solar cells are folded;
   (3) the second lead has a cylinder section which accepts insertion of the rod section of the first lead;
   (4) the coil spring is positioned around the rod section of the first lead, and is disposed between the outer surface of the rod section of the first and lead the inner surface of the cylinder section of the second lead; and
   (5) the first lead and second lead are resiliently contacted by the coil spring for electrical connection.

5. The solar cell apparatus as recited in claim 4 wherein the first lead has the form of a metal rod bent in a C-shape, the center region is the rod section, both end regions connect to a solar cell device, and the cylinder section of the second lead is connected to the rod section via the coil spring in a manner such that the cylinder section does not slide laterally.

6. A solar cell apparatus having solar cells wherein the solar cells are connected by flexible leads in a manner allowing folding, each flexible lead is provided with a first lead, a second lead, and a coil spring, and characterized in that:
   (1) the first lead and the second lead are connected to the solar cells;
   (2) the first lead has a rod section positioned on a folding line created when the solar cells are folded;
   (3) the second lead has a cylinder section with a base which accepts insertion of the rod section of the first lead;
   (4) the coil spring is inserted within the cylinder section of the second lead, and is disposed between the surface of the base of the cylinder section of the second lead and the surface of the end of the rod section of the first lead; and
   (5) the first lead and the second lead are resiliently contacted by the coil spring for electrical connection.

7. Solar cell apparatus comprising:
   a plurality sheets each defining a solar cell; and
   a plurality of conducting fasteners detachably connecting the sheets of each of the solar cells, both mechanically and electrically.

8. The solar cell apparatus as claimed in 7, wherein each of said sheet has a rectangular shape, said fasteners are located around both ends of each of facing sides of each of said sheets of the solar cell, and said fasteners are located around both ends in one of the facing sides conducting each other.

9. A solar cell apparatus comprising:
   a plurality of sheets each defining a solar cell;
   an insulating film sheet having at least two rows of conducting lines; and
   a plurality of conducting fasteners detachably connecting said sheets of each of the solar cells, both mechanically and electrically on said at least two rows of conducting lines.

10. The solar cell apparatus as claimed in claim 9, wherein the sheet having a rectangular shape, fasteners locating around both ends of each of facing sides in the sheet of the solar cell, the fasteners located around both ends of one of the facing sides conducting each other.

* * * * *